United States Patent
Chakraborty et al.

(10) Patent No.: US 10,070,385 B2
(45) Date of Patent: Sep. 4, 2018

(54) MULTI-BAND CONCURRENT MULTI-CHANNEL RECEIVER

(71) Applicant: TEXAS INSTRUMENTS INCORPORATED, Dallas, TX (US)

(72) Inventors: Sudipto Chakraborty, Plano, TX (US); Ram Pratap Aditham, Den Bosch (NL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 79 days.

(21) Appl. No.: 14/986,159

(22) Filed: Dec. 31, 2015

(65) Prior Publication Data

US 2017/0195961 A1 Jul. 6, 2017

(51) Int. Cl.
| | |
|---|---|
| *H04W 52/02* | (2009.01) |
| *H04L 27/26* | (2006.01) |
| *H04B 1/00* | (2006.01) |
| *H04B 1/10* | (2006.01) |
| *H04L 25/03* | (2006.01) |

(52) U.S. Cl.
CPC ........ *H04W 52/0229* (2013.01); *H04B 1/005* (2013.01); *H04B 1/10* (2013.01); *H04L 27/2647* (2013.01); *H04W 52/0261* (2013.01); *H04L 25/03821* (2013.01); *Y02D 70/00* (2018.01)

(58) Field of Classification Search
CPC ................................................ H04W 52/0229
See application file for complete search history.

(56) References Cited

U.S. PATENT DOCUMENTS

| | | | | |
|---|---|---|---|---|
| 9,628,215 | B2* | 4/2017 | Tan | H04J 11/005 |
| 9,712,113 | B2* | 7/2017 | Selvanayagam | H03D 7/1441 |
| 2003/0128776 | A1* | 7/2003 | Rawlins | H03G 3/20 |
| | | | | 375/319 |
| 2006/0183421 | A1* | 8/2006 | Proctor, Jr. | H04B 7/15521 |
| | | | | 455/11.1 |
| 2010/0274607 | A1* | 10/2010 | Carresjo | B60C 23/0416 |
| | | | | 705/7.11 |
| 2012/0177147 | A1* | 7/2012 | Park | H04L 27/2647 |
| | | | | 375/316 |
| 2015/0280661 | A1* | 10/2015 | Xu | H03F 3/189 |
| | | | | 455/341 |
| 2017/0028796 | A1* | 2/2017 | Patel | B60C 23/0408 |
| 2017/0094346 | A1* | 3/2017 | Rugoobur | H04N 21/43637 |

* cited by examiner

*Primary Examiner* — John Blanton
(74) *Attorney, Agent, or Firm* — Gregory J. Albin; Charles A. Brill; Frank D. Cimino

(57) ABSTRACT

A system of multiple concurrent receivers is described to process multiple narrow bandwidth wireless signals with arbitrary bandwidth and center frequency separation. These multiple receivers may provide a downconverted signal at the baseband frequency to process signal bandwidth using the lowest power consumption while using fully modular signal processing blocks operating at the low frequency. The concurrent receivers may operate from a single high frequency amplifier and may be derived from a low impedance point to reduce loading and improve scalability. The center frequency and bandwidth of each of the channels as well as phases of each of the channels may be independently reconfigured to achieve scalability, and on-chip test and calibration capability.

20 Claims, 6 Drawing Sheets

MULTI-BAND CONCURRENT MULTI-CHANNEL RECEIVER

BACKGROUND

Electrical receivers are used in a variety of applications. For example, next generation automotive vehicles may have multiple onboard systems and sensors that send data to a centralized computer module. Such data may include, for example, pressure data from a tire pressure monitoring system, as well as information from entertainment, air conditioning, or other such systems. Such a wireless communication system may benefit from a receiver that can receive multiple channels simultaneously. One channel may be used to continuously provide data (e.g., tire pressure data) and another channel may be used more intermittently such as for entertainment or air conditioning control data. Such channels may be generally unrelated with respect to their input power level, channel raster, modulation, information content, and instantaneous phase. Separation between the center frequencies of the channels may be arbitrarily close or far apart.

BRIEF DESCRIPTION OF THE DRAWINGS

For a detailed description of various examples, reference will now be made to the accompanying drawings in which.

DETAILED DESCRIPTION

Figure 1:
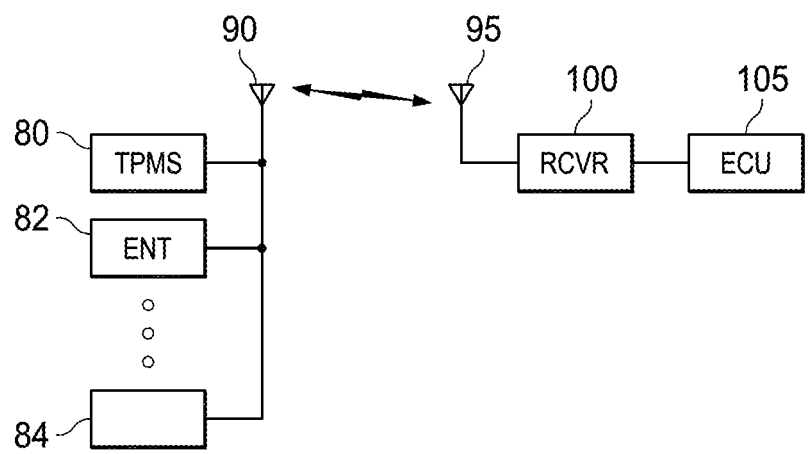
FIG. 1 shows a system in which multiple devices wirelessly communicate simultaneously over different channels to a common receiver in accordance with various examples.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

Some multichannel receivers may use a high bandwidth, high resolution analog-to-digital converter (ADC) as well as high speed signal processing in digital logic to perform signal processing in the back-end after limited front-end amplification and downconversion. Such systems unfortunately are characterized by a relatively high level of power consumption as they operate over higher bandwidth than that is occupied by the sum of information content from individual channels. In accordance with the disclosed embodiment, however, a low power receiver is disclosed that splits a received signal in a radio frequency (RF) front-end into multiple signal paths that are concurrently active and process signals in a narrowband manner by processing a bandwidth that equals to the sum of the information content of individual channels. The channels may be transmission channels and each transmission channel may contain any one or more of commands, data, control information, and other types of information as desired. The split of the received signal may occur at a relatively low impedance point (e.g., between about 40 and about 100 ohms). By splitting the received signal at a low impedance point, the disclosed architecture maximizes bandwidth and reduces the level of loading on the signal itself. A low impedance split also provides a current mode interface in the architecture that enhances linearity of the signal processing blocks as they process small signal swings. The separate signal paths downstream of the split point are essentially copies of each other and thus fully modular in nature, containing all of the frequency content of the wireless transmitted signals. That is, each signal path includes multiple channels of data on different carrier frequencies. The frequency of each split signal path may be separately downconverted to a different baseband frequency level (the frequency of one of the channels) and converted to the digital domain by a relatively low resolution, low speed ADC. These requirements may also lead to improvement in the area of the ADC, leading to overall optimization of area. As a result, the disclosed receiver consumes less power than conventional wideband multichannel receivers. By using a combination of frequencies and phases, multiple channels with variable center frequency separation can be received and processed. An RF amplifier in the disclosed receivers uses a configurable single-ended or differential input and provides the low impedance point to split the RF signal. Baseband filters also are used that employ bandwidth boosting techniques to cover the dynamic range of data rates.

The disclosed techniques are applicable to automotive applications, but are applicable as well to other applications. In one example of an automotive application, a tire pressure monitoring system (TPMS) uses one channel to continuously transmit (e.g., twice per second) tire pressure data to the receiver. Another channel may operate at a different frequency and may be used to transmit other automotive-related data such as data from the entertainment system, air conditioning, etc.

FIG. 1 shows an example of a communication system 50 in accordance with various embodiments. The system 50 includes one or more monitoring devices or sensors 80, 82, and 84 which wireless transmit data to a receiver 100 through antennas 90 and 95. Although three monitoring devices 80, 82, 84 are shown, any number of such devices are possible. The function performed by each such monitoring device can be any of a variety of functions. In the example of FIG. 1, device 80 is a tire pressure monitoring system (TPMS) for an automobile and device 82 is the automobile's entertainment system which may be used to control music, air conditioning and other functions of the automobile.

Figure 2:
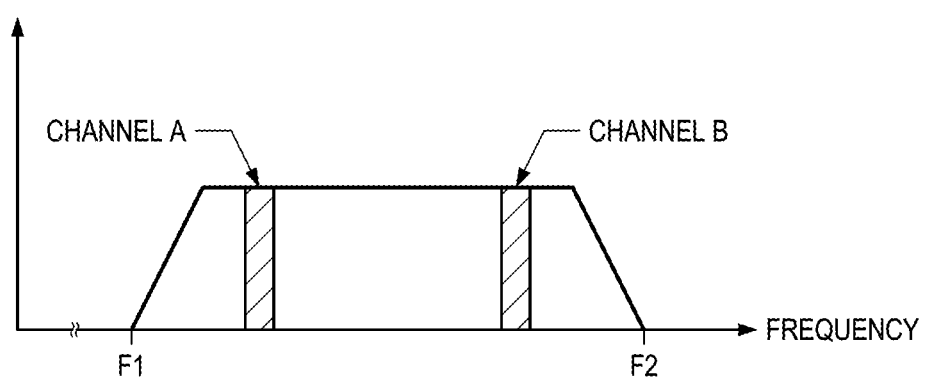
FIG. 2 shows an example of a frequency spectrum including two such channels in accordance with various examples.

Each such device 80-84 may encode data on a carrier signal of a particular frequency to form a channel. The frequency used by each device 80-84 may be different than the frequency of the other devices. That is, the TPMS 80 may transmit on one frequency, while the entertainment system 82 may transmit on a different frequency. FIG. 2 shows an illustrative frequency band usable in connection with the communication system 50 of FIG. 1. The various devices 80-84 may communicate within a specified frequency band defined between frequencies F1 and F2. In one example, F1 is 312 MHz and F2 is 315 MHz. In this example, therefore, the frequency band for the communication system 50 is from 312 MHz to 315 MHz. In another embodiment, data on three frequencies may be transmitted with the center frequency used for the continuous transmission of data (e.g., TPMS data), and frequencies symmetrically located on either side of the center frequency for other data (e.g., non-continuous data).

Within the defined frequency band for use by the communication system 50, one or more channels are provided for use by the various devices 80-84. Channel A, for example, may be used by device 80, while Channel B may be used by device 82. The devices may communicate using their respective channels and may do so concurrently. That is, devices 80 and 82 may transmit their data through antenna 90 simultaneously over two different frequency channels to receiver 100. Such channels may be completely unrelated with respect to their input power level, channel raster, modulation, information content, and instantaneous phase. Separation between the center frequencies of the channels may be arbitrarily close or far apart. The amplitude of the signals of Channels A and B may be the same (as shown) or different from each other.

The receiver 100 receives the multichannel wireless signal from its antenna 95 and extracts the various channel data for further processing by an electronic control unit (ECU) 105. The ECU 105 may be a computer module and contain a processor, memory, and other components to process and respond to data wirelessly received over the various channels from the various devices 80-84. The ECU 105 may control one or more operational aspects of a vehicle (e.g., automobile). In one example, one channel of the multichannel wireless signal may contain tire pressure data which the ECU may use to monitor tire pressure and generate and alert if a tire pressure is below a threshold. Another channel may be used to transmit data of an entertainment system 82 of the vehicle.

Figure 3:
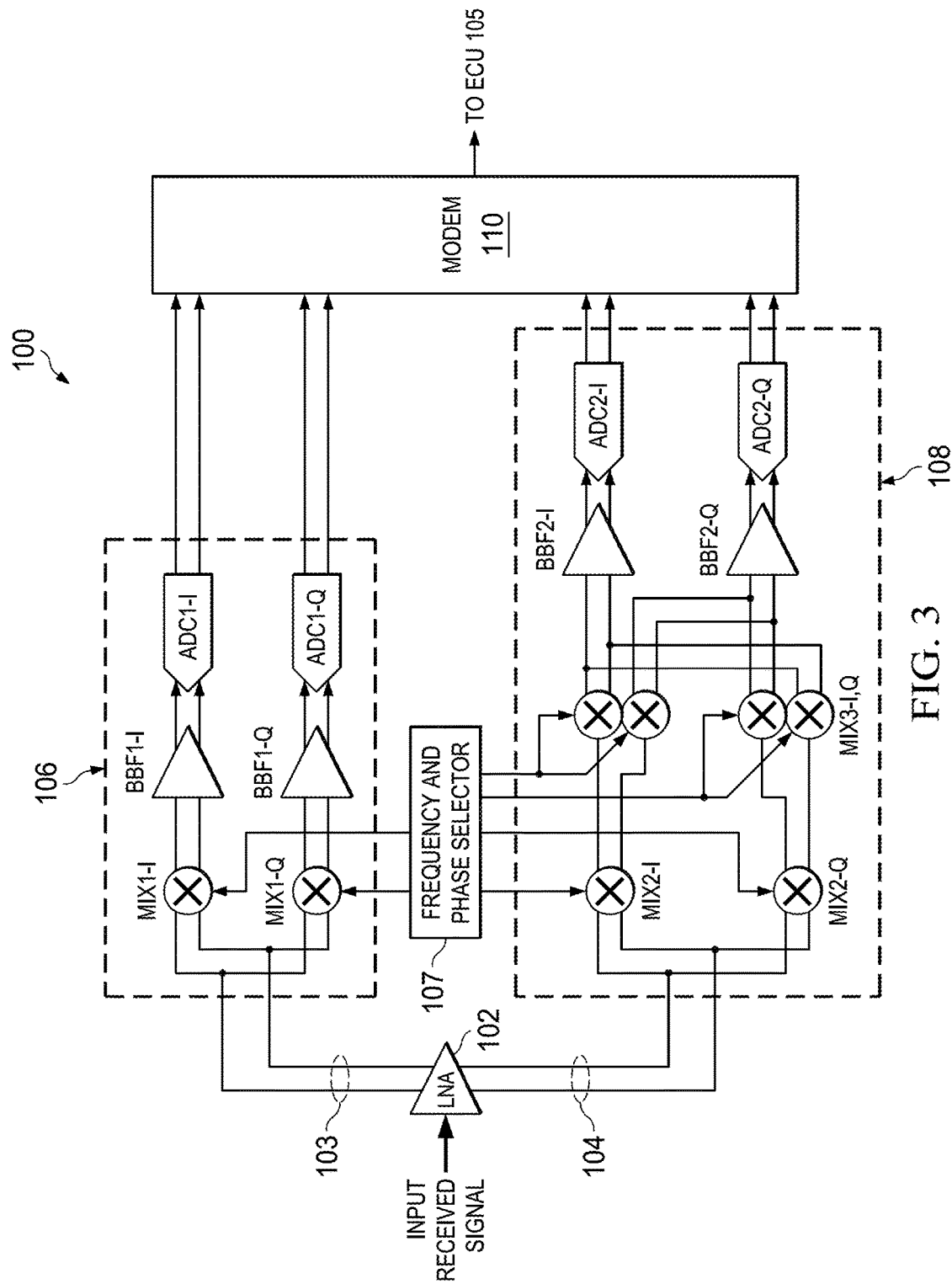
FIG. 3 illustrates the receiver in accordance with various examples.

FIG. 3 shows an example of an implementation of the receiver 100 in accordance with various embodiments. In this example, the receiver 100 includes a low noise amplifier (LNA) 102, mixers, baseband filters, ADCs and a modem 110. Other components may be included as well, and the architecture may be different from the particular architecture shown in FIG. 3. The wirelessly received signal is amplified by the LNA 102 and converted to differential signals at the output. The mixers are employed in quadrature phases, where a broadband phase shift is obtained from the input to the output by the use of quadrature signal phases. Such quadrature signals can be used for polyphase signal processing, for example, to cancel blockers at a specific frequency of interest.

The received signal is split at a low impedance point within the LNA 102 (as detailed below) to produce two pairs of differential signals 103 and 104, respectively, as shown. The first differential signal 103 is processed via a first signal conditioning circuit 106, and the second differential signal 104 is processed via a second signal conditioning circuit 108 which is in parallel with the first signal path. The first signal conditioning circuit 106 extracts Channel A from I/Q signals 103. The second signal conditioning circuit 108 extracts Channel B from I/Q signals 104. The extracted signals are extracted at baseband frequencies which are substantially lower than their carrier frequencies. Once extracted, the Channel A I/Q signals and the Channel B I/Q signals are provided to a modem 110 for further processing, and then on to the ECU 105. In some embodiments, the signal can be split to create at least three copies of the signal. Two of the copies of the signal are provided to the first and second signal conditioning circuits 106 and 108, respectively, and the system may include at least a third signal conditioning circuit in parallel with the first and second signal conditioning circuits to receive a third copy of the split signal.

Each mixer accepts two signals as inputs—a large signal called the "local oscillator" (LO) and a smaller signal called the "RF signal." The LO signals are generated and provided to the mixers by the frequency phase selector 107. Each mixer multiplies its received RF signal (e.g., differential signals 103 and 104) by the local oscillator to generate an output "IF" signal. The IF signal may carry essentially the same information as the RF signal but at a much lower frequency. Thus, the mixers used in the embodiment of FIG. 3 may downconvert the frequency of their input RF signals. The mixers thus permit the received signals to be processed at much lower frequencies than the original Channel A and B signal frequencies.

The mixers in the first signal conditioning circuit 106 include MIX1-I for the in-phase signal (I) and MIX1-Q for the quadrature signal (Q). For the second signal conditioning circuit 108, two cascaded mixer stages are included as shown. The first mixer stage includes mixers MIX2-I and MIX2-Q for the I and Q signals, respectively. The second mixer stage includes mixers MIX3-I,Q as shown. The first mixer stage (MIX2-I and MIX2-Q) downconverts the frequency of the input I and Q signals 104 to a low intermediate frequency, and the second stage of mixers provides the remainder of the frequency shift such that the baseband filters (indicated by BBF) and the ADC hardware are identical to each other and a fully modular baseband design can be utilized. As an example, two channels present at 312 MHz and 315 MHz in the RF band are downconverted with an LO frequency of 310 MHz. Thus, the first set of mixers in the first signal conditioning circuit 106 in the first channel provide (i.e., MIX1-I/Q) an output signal at 2 MHz, and the first set of mixers of the second signal conditioning circuit 108 in the second channel (i.e., MIX2-I/Q) provide an output at 5 MHz. The second set of mixers MIX3_I/Q in second channel uses another LO frequency of, for example, 3 MHz, so the low frequency baseband output from the second set of mixers in the second channel (MIX3-IQ) is also at 2 MHz, and a fully modular baseband filter and ADC hardware can used, where they all operate with respect to a 2 MHz bandwidth. In general, the mixers (MIX1-I/Q) of the first signal conditioning circuit 106 are clocked or driven with a LO signal at the same frequency as the first stage mixers (MIX2-I/Q) of the second signal conditioning circuit 108, and the second stage mixers of the second signal conditioning circuit are clocked or driven with an LO signal at a frequency that is synchronously derived from the common frequency used to clock the mixers MIX1-I/Q and MIX2-I/Q.

Each of the first and second signal conditioning circuits 106, 108 includes baseband filters (BBF1-I, BBF1-Q, BBF2-I and BBF2-Q) as shown. The BBF1/2-I/Q may be the same hardware in some embodiments. The various baseband filters are designed to provide variable gain to the downconverted signal at the baseband frequency and they may provide wide tunability to accommodate a wide variation of the frequency and amplitude of the IF input signal to the filters. The signal processing by the baseband filters is inherently low-pass in nature which means that the filters can be used in conjunction with a direct conversion or a low IF architecture. While processing continuous time bandwidth-limited signals at the baseband, direct conversion offers maximum bandwidth, while low IF offers a response which may be immune to DC impairments. In at least some embodiments, both architectures may be implemented by adjusting the LO frequency to the downconverting mixers.

After channel filtering by the baseband filters, signal digitization is performed using the analog-to-digital converters ADC1-I, ADC1-Q, ADC2-I and ADC2-Q. Such ADCs may utilize the same hardware and achieve low power and low area. The digitized results are then provided to a modem 110 and through the modem to the ECU 105.

Referring still to FIG. 3, each pair of the differential output signals of output signals from the LNA 102 (i.e., signals 103 and 104) is provided to the quadrature mixers. The clock (or LO signal) to each mixer is generated by a frequency and phase selector 107. The frequency and phase selector 107 may derive the clock for each mixer from a single phase lock loop (PLL) system after employing dividers along with duty cycle shaping (25% or 50% depending on the application).

The first stage mixers (MIX2-I/Q) of the second signal conditioning circuit 108 is clocked or driven with the same LO frequency as the mixers MIX1-I/Q of the first signal conditioning circuit 106. The second stage mixers (MIX3-I/Q) of the lower signal conditioning circuit 108 are clocked or driven with an LO signal of a frequency approximately equal to the magnitude of the difference of the carrier frequencies of the two channels to be received. This frequency may be derived synchronously from a higher frequency clock signal. As such, the first signal conditioning circuit 106 may employ single frequency conversion, while the second signal conditioning circuit 108 may employ two stage mixing architecture.

Figure 4:
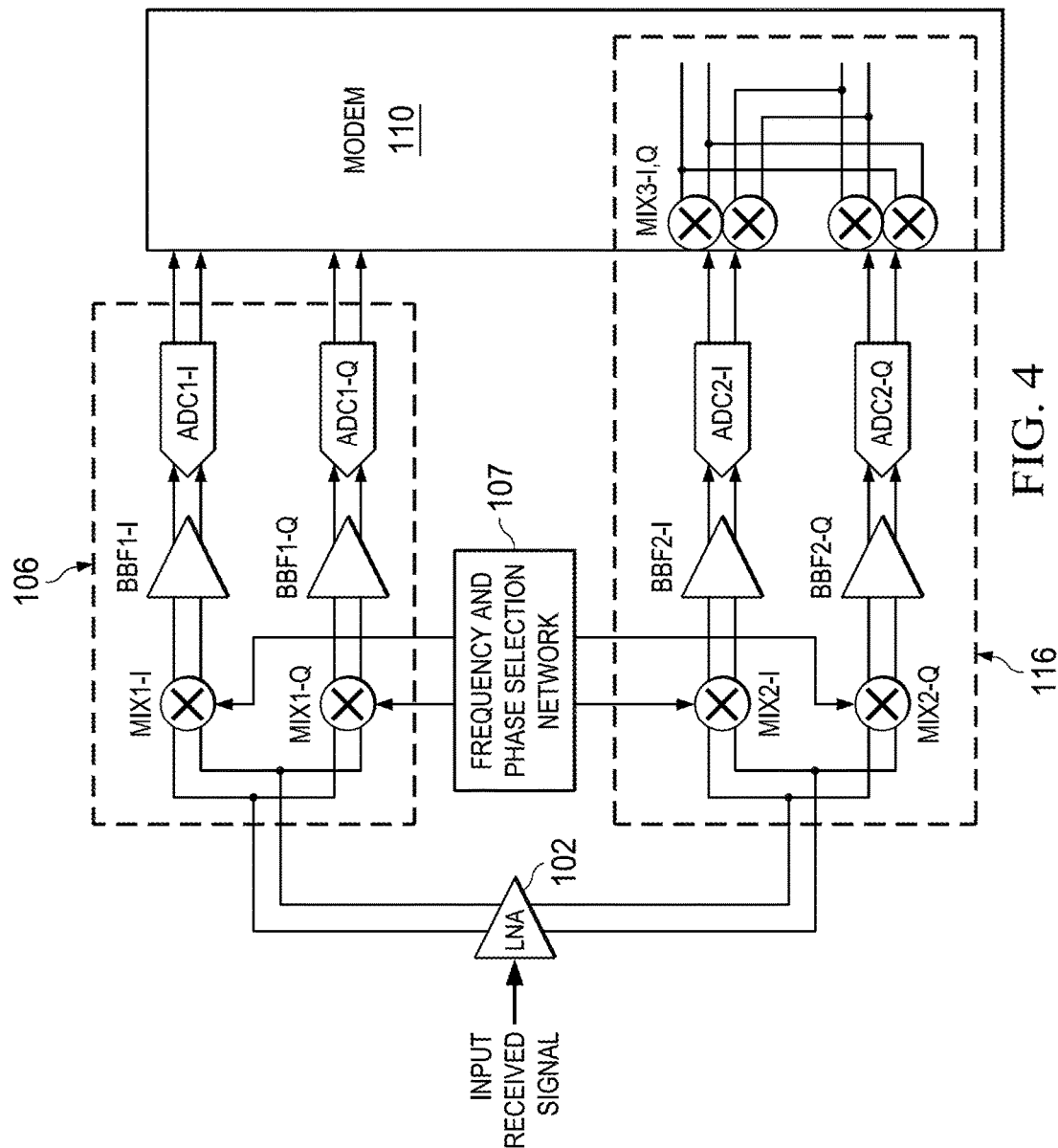
FIG. 4 shows an example of the front-end architecture for a low noise amplifier used in the receiver which splits the input signal at a low impedance point.

FIG. 4 shows an embodiment of the receiver similar to that of FIG. 3 but with a different second signal conditioning circuit. The second signal conditioning circuit (designated as circuit 116 in FIG. 3) provides the second stage of mixers (MIX3-I/Q) implemented in the modem 110 as digital gates in the modem. Implementation of the mixer hardware completely in digital may result in superior phase accuracy for the signal processing. The baseband filters in the signal conditioning circuit 116 (BBF2-I/Q) may not be the same hardware as the baseband filters BBF1-I/Q in the first signal conditioning circuit 106. The BBF2-I/Q filters may be implemented using biquadratic stages to provide filtering that is either of bandpass or low pass in nature. Hence, bandpass filters constructed using the same structure as the BBF1-I/Q filters while tapping different points in the filter architecture. The ADCs in both signal conditioning circuits 106, 116 may be same hardware as was the case for the embodiment of FIG. 3.

Figure 5:
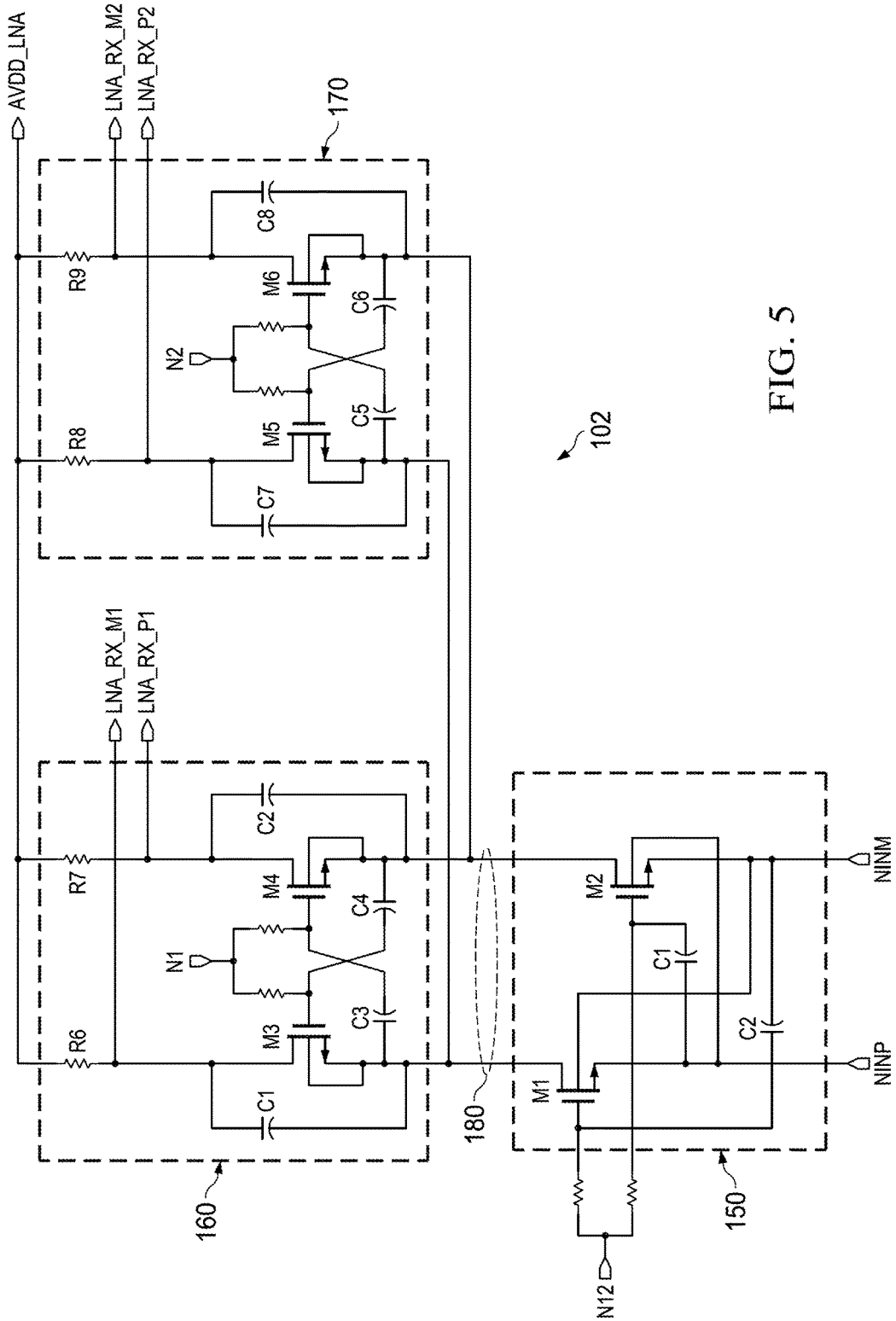
FIG. 5 shows an example of the circuit schematic for a low noise amplifier used in the receiver which splits the input signal at a low impedance point.

FIG. 5 illustrates an embodiment of the LNA 102. In general, using a single LNA to drive mixers simultaneously corresponding to two different receive channels can lead to loss in the signal power and also degradation in sensitivity of both the receive channels compared to the case where the LNA is driving only mixers in one receive channel at any given time. The disclosed LNA 102 overcomes such problems while not increasing current consumption. LNA 102 includes a capacitive cross-coupled, common gate input differential transistor pair 150. This differential transistor pair includes transistors M1 and M2 which are cross-coupled via capacitors C1 and C2. Capacitor C1 is connected between the gate of M1 and the source of M2, and similarly, capacitor C2 is connected between the gate of M2 and the source of M1. The differential transistor pair 150 can be driven from an antenna in either a single ended manner without employing a balun or in a differential manner if required at nodes NINP and NINM. The capacitive cross coupling used in the common gate differential pair boosts the pair's small signal transconductance gain while also keeping the gain constant over a wide frequency bandwidth. This gain can be enhanced further by using bulk cross-coupling as shown. The LNA 102 uses the enhanced transconductance and resulting larger signal current to feed two additional capacitive, cross-coupled common gate output differential transistor pairs 160 and 170. Cross-coupled differential transistor pair 160 includes transistors M3 and M4 and cross-coupling capacitors C3 and C4. Cross-coupled differential transistor pair 170 includes transistors M5 and M6 and cross-coupling capacitors C5 and C6.

Point 180 in the LNA 102 represents a relatively low impedance point for the differential signals, and it is at this low impedance point 180, that the signals are split to be provided to each differential transistor pair 160 and 170. More than two splitting points may also be used at the low impedance point so that the architecture may be scalable. The signal split that occurs as a result of simultaneously feeding the two transistor pairs 160, 170 happens at a low impedance point providing the advantage that the wide bandwidth of the input differential transistor pair 150 is not compromised. The two differential pairs 160, 170 are cascoded on top of the base differential transistor pair 150. Differential pairs 160, 170 can be configured independently to reuse partly or completely the total DC and signal current consumed by the base differential pair 150. Such configuration of the differential pairs 160, 170 may be performed by adjusting the bias voltage at nodes N1 and N2. As differential transistor pairs 160, 170 themselves use capacitive cross-coupling, they are gain-boosted which in turn helps each of them to drive mixers of the separate receive channel (i.e., signal conditioning circuits 106, 108) simultaneously without incurring significant loss in signal power. This configuration also provides isolation and reduces or eliminates cross-talk between the two receive channels.

Each of the two differential transistor pairs 160, 170 use capacitive elements to function as feedforward signal paths. Transistor pair 160 includes capacitive elements C1 and C2, and transistor pair 170 includes capacitive elements C7 and C8. These capacitive elements partially function as feedforward paths for the signal coming from the base differential pair while also acting to suppress the noise generated by the transistors M3, M4, M5, and M6 across which the capacitive elements act as shunt elements. This configuration therefore allows the LNA 102 to drive the two receive channels without impacting the sensitivity of either of the receive channels.

Figure 6:
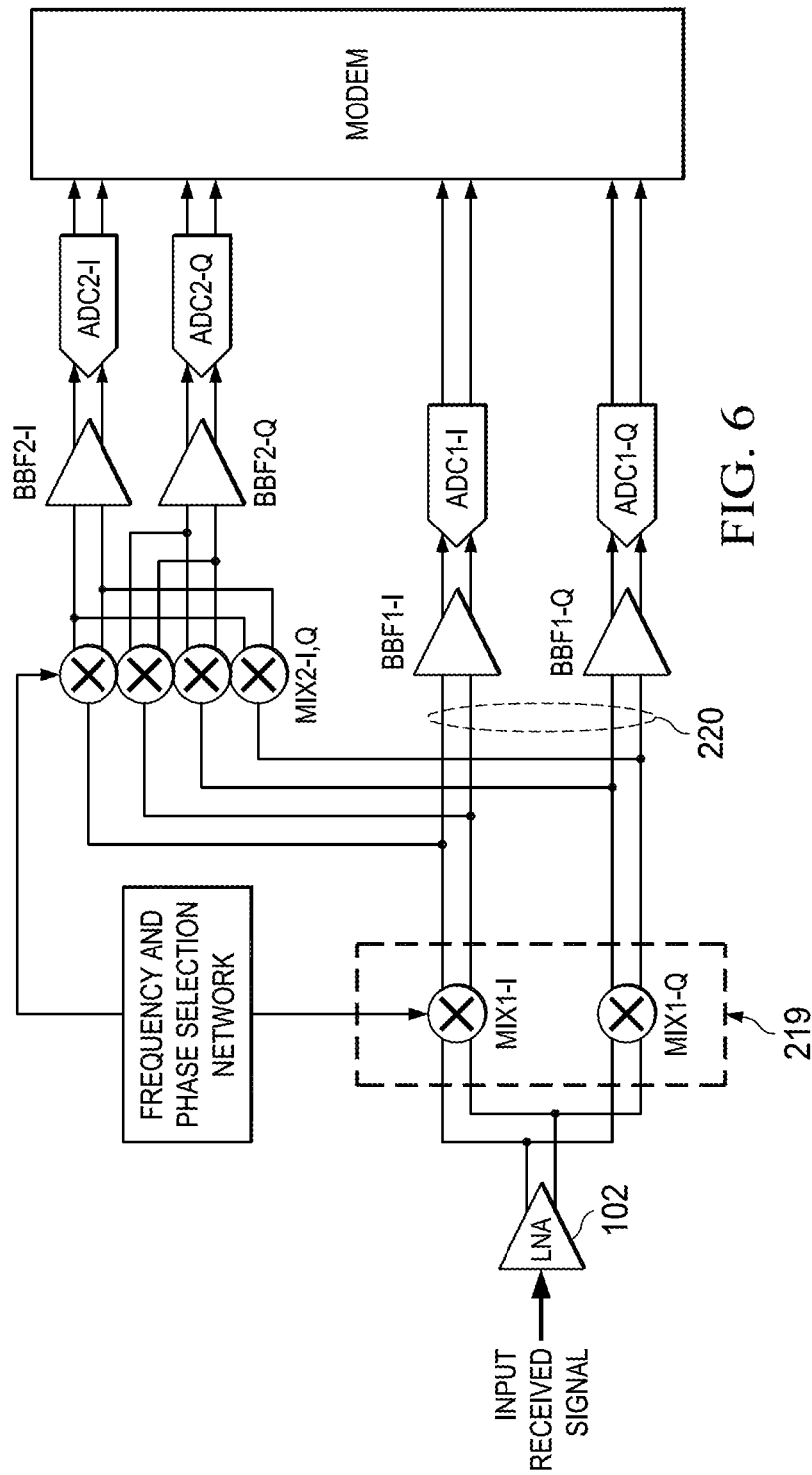
FIG. 6 shows an example where the low impedance split point can be implemented at low frequency (baseband)
Figure 7:
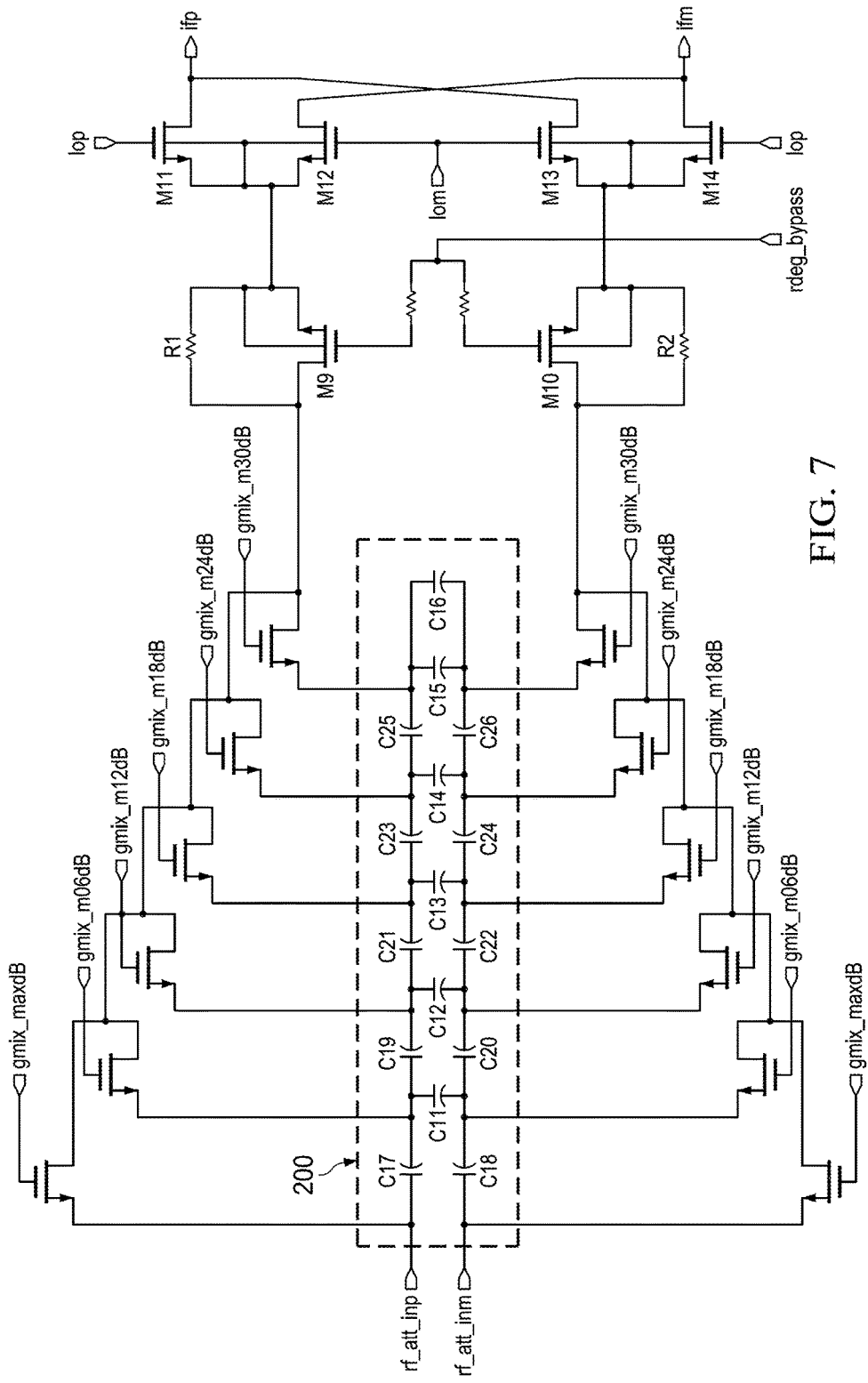
FIG. 7 illustrates a technique for automatic gain control in accordance with various embodiments.

FIG. 6 shows another embodiment of the receiver. In the embodiment of FIG. 6, the low impedance split point is not internal to the LNA 102, and instead is at point 220 as shown. In this implementation, only one set of mixers 219 is used at the RF frequency, leading to lower loading from the LO distribution network. The first set of mixers provide the maximum frequency shift to translate the signals to IF frequency, and the second set of mixers simply process the offset frequency At least some radio receivers employ Automatic Gain Control (AGC) to control the strength of the received signal such that the stages through which the signal passes do not saturate. In accordance with various embodiments, a particular AGC scheme is employed at the interface between the LNA 102 and each of the first stage mixers (MIX1-I/Q and MIX2-I/Q). The mixers used in some embodiments may comprise passive mixers. An example is shown in FIG. 7 of a passive mixer which is resistively degenerated by resistors R1 and R2 for the purposes of providing improved second order linearity performance. In the degenerated configuration, a linear resistor is placed in series with the nonlinear transistor to reduce nonlinearity generated from the mixer. However, the resistors R1 and R2 also provide a resistive impedance seen in to the mixer, which comprises transistors M11-M14. This property is exploiting for AGC purposes as well. A cascaded capacitive attenuator 200 including capacitors C10-C26 provides attenuation steps of a fixed ratio in conjunction with the resistive impedance provided by R1 and R2. The capacitive attenuator 200 in turn provides a constant impedance to the LNA 102 irrespective of the attenuation chosen through the various attenuation selection inputs (gmix_maxdB, gmix_m06 dB, gmix_12 dB, gmix_m18 dB, gmix_24 dB, and gmix-m30 dB). The capacitance attenuator 200 can be incorporated into, or subsumed within, the capacitance that is at the output of the LNA 102 which is usually tuned for setting the frequency at which the LNA 102 is to operate.

In integrated circuits and systems, built-in self-calibration permits the cost of testing to be reduced, power consumption to be reduced, and permits easy testing anytime during the product's lifetime to enhance robustness. Such implementations of built-in-self-calibrations require minimum hardware to be placed in silicon. In the present embodiments, since there are multiple parallel channels to simultaneously receive signals, one of the channels may be configured to operate as a transmitter, thereby enabling loopback calibration. In another embodiment, two channels may be simultaneously activated with respect to different LO frequencies and baseband bandwidth so that the hardware dedicated to one receiver may be used to calibrate the main receiver. This implies that during the calibration phase out of N simultaneous channels, one channel can be configured to receive a reference signal, while the other(s) may be reconfigured to operate as a calibration receiver to calibrate an electrical characteristic of the receiver, examples of which may include filter center frequencies, impedances, gains etc.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A receiver, comprising:
   an amplifier configured to receive a signal wirelessly transmitted to the receiver, the received signal including multiple channels of data on different frequencies, and the amplifier is configured to split the received signal to provide first and second copies of the signal, the amplifier including:
   an input;
   first and second outputs;
   a first differential pair of transistors having an input coupled to the input of the amplifier;
   a second differential pair of transistors having an input coupled to an output of the first differential pair, and an output coupled to the first output of the amplifier; and
   a third differential pair of transistors having an input coupled to an output of the first differential pair, and an output coupled to the second output of the amplifier; the receiver further comprising:
   a first signal conditioning circuit configured to receive the first copy of the signal and to downconvert the signal to a first baseband frequency to thereby recover a first transmission channel; and
   a second signal conditioning circuit configured to receive the second copy of the signal and to downconvert the signal to a second baseband frequency to thereby recover a second transmission channel.

2. The receiver of claim 1, wherein the amplifier is a low noise amplifier.

3. The receiver of claim 1, wherein the amplifier is configured to split the received signal at a junction point between the output of the first differential pair of transistors and inputs of the second and third differential pairs of transistors.

4. The receiver of claim 1, wherein each of the first and second signal conditioning circuits includes first and second stages of mixers and a plurality of baseband filters, wherein the first stage of mixers are clocked with or driven by a first local oscillator (LO) signal, and the second stage of mixers are clocked with or driven by a second LO signal, and wherein the second LO signal is approximately equal to the magnitude of the difference between two radio frequency carrier frequencies used by two received channels.

5. The receiver of claim 4, wherein the first signal conditioning circuit includes:
   a single mixer stage and the second signal conditioning circuit includes a pair of cascaded first and second mixer stages;
   wherein a common clock frequency is used to clock the mixers of the single mixer stage of the first signal conditioning circuit and the mixers of the first mixer stage of the second signal conditioning circuit; and
   wherein a clock derived from and having a lower frequency than the common clock frequency is used to clock the mixers of the second mixer stage of the second signal conditioning circuit.

6. The receiver of claim 1, wherein the amplifier comprises first and second transistors, wherein each of the first and second transistors includes a drain and a source, the source of each of the first and second transistors connected to the gate of the other transistor via a capacitor, and wherein the sources of the first and second transistors provide a low impedance point to split the received signal.

7. The receiver of claim 1, wherein the amplifier is configured to split the received signal into at least three copies of the signal, wherein two of the copies are provided to the first and second conditioning circuits, respectively, and the system includes a third signal conditioning circuit configured to receive a third copy of the signal.

8. A system, comprising:
   an electronic control unit;
   a wireless receiver coupled to the electronic control unit and including:
   an amplifier configured to receive a multichannel signal and to provide first and second copies of the multichannel signal; and
   a plurality of signal conditioning circuits coupled to the receiver and coupled in parallel with respect to each other, wherein the first copy of the multichannel signal is provided to one of the signal conditioning circuits and the second copy of the multichannel signal is provided to another of the signal conditioning circuits;

wherein separate output channel signals from the wireless receiver are provided to the electronic control unit, and wherein the amplifier includes:
   an input;
   first and second outputs;
   a first differential pair of transistors having an input coupled to the input of the amplifier;
   a second differential pair of transistors having an input coupled to an output of the first differential pair, and an output coupled to the first output of the amplifier; and
   a third differential pair of transistors having an input coupled to an output of the first differential pair, and an output coupled to the second output of the amplifier.

9. The system of claim 8, wherein the electronic control unit is configured to use a channel of the multichannel signal to calibrate an electrical characteristic of the receiver.

10. The system of claim 8, wherein the plurality of signal conditioning circuits include:
   a first signal conditioning circuit configured to receive the first copy of the multichannel signal and to downconvert the multichannel signal to a first baseband frequency to thereby recover a first transmission channel; and
   a second signal conditioning circuit configured to receive the second copy of the multichannel signal and to downconvert the multichannel signal to a second baseband frequency to thereby recover a second transmission channel;
   wherein the first baseband frequency is different than the second baseband frequency.

11. The system of claim 10, wherein each of the first and second signal conditioning circuits includes one or more stages of mixers and a plurality of baseband filters, wherein the first stage of mixers are clocked with or driven by a first local oscillator (LO) signal, and the second stage of mixers are clocked with or driven by a second LO signal, and wherein the second LO signal is approximately equal to the magnitude of the difference between two radio frequency carrier frequencies used by two received channels.

12. The system of claim 8, wherein the amplifier is a low noise amplifier.

13. The system of claim 8, wherein the amplifier is configured to split the received multichannel signal at a junction point between output of the first differential pair of transistors and inputs of the second and third differential pairs of transistors.

14. The system of claim 8, wherein:
   a first signal conditioning circuit includes a single mixer stage and a second signal conditioning circuit includes a pair of cascaded first and second mixer stages;
   a common clock frequency is used to clock the mixers of the single mixer stage of the first signal conditioning circuit and the mixers of the first mixer stage of the second signal conditioning circuit.

15. The system of claim 14, wherein a clock derived from and having a lower frequency than the common clock frequency is used to clock the mixers of the second mixer stage of the second signal conditioning circuit.

16. The system of claim 8, wherein the amplifier comprises first and second transistors, wherein each of the first and second transistors includes a drain and a source, the source of each of the first and second transistors connected to the gate of the other transistor via a capacitor, and wherein the sources of the first and second transistors provide a low impedance point to split the received signal.

17. The system of claim 8, wherein the electronic control unit is configured to control an operational aspect of a vehicle.

18. A method, comprising:
   wirelessly receiving a multichannel signal;
   splitting the received multichannel signal to provide first and second radio frequency (RF) signals, with an amplifier that includes:
      an input;
      first and second outputs;
      a first differential pair of transistors having an input coupled to the input of the amplifier;
      a second differential pair of transistors having an input coupled to an output of the first differential pair, and an output coupled to the first output of the amplifier; and
      a third differential pair of transistors having an input coupled to an output of the first differential pair, and an output coupled to the second output of the amplifier; the method further comprising:
   downconverting the first RF signal to a first baseband frequency; and
   downconverting the second RF signal to a first baseband frequency.

19. The method of claim 18, wherein splitting the received multichannel signal to provide first and second RF signals includes splitting received multichannel signal at an impedance point within a wireless receiver that is between about 40 ohms and 100 ohms.

20. The method of claim 18, wherein wirelessly receiving the multichannel signal comprises receiving a signal that includes tire pressure data of a vehicle on a first channel and data of an entertainment system of the vehicle in another channel.

* * * * *